US012037533B2

(12) United States Patent
Sahin

(10) Patent No.: US 12,037,533 B2
(45) Date of Patent: Jul. 16, 2024

(54) AGGLOMERATE ABRASIVE GRAIN

(71) Applicant: IMERTECH SAS, Paris (FR)

(72) Inventor: Ertan Sahin, Berlin-Steglitz (DE)

(73) Assignee: Imertech SAS, Paris (FR)

( * ) Notice: Subject to any disclaimer, the term of this patent is extended or adjusted under 35 U.S.C. 154(b) by 211 days.

(21) Appl. No.: 15/733,198

(22) PCT Filed: Dec. 10, 2018

(86) PCT No.: PCT/EP2018/084234
§ 371 (c)(1),
(2) Date: Jun. 9, 2020

(87) PCT Pub. No.: WO2019/115476
PCT Pub. Date: Jun. 20, 2019

(65) Prior Publication Data
US 2021/0102105 A1   Apr. 8, 2021

(30) Foreign Application Priority Data
Dec. 14, 2017   (DE) .................. 10 2017 130 046.5

(51) Int. Cl.
C09K 3/14      (2006.01)
C04B 35/117    (2006.01)
C04B 35/626    (2006.01)
C04B 35/63     (2006.01)

(52) U.S. Cl.
CPC .......... *C09K 3/1436* (2013.01); *C04B 35/117* (2013.01); *C04B 35/62695* (2013.01); *C04B 35/6316* (2013.01); *C04B 2235/3217* (2013.01); *C04B 2235/3427* (2013.01); *C04B 2235/349* (2013.01); *C04B 2235/5436* (2013.01)

(58) Field of Classification Search
CPC ... C04B 14/303; C04B 18/021; C04B 18/022; C04B 2235/3217; C04B 2235/3427; C04B 2235/349; C04B 2235/5436; C04B 28/006; C04B 28/26; C04B 35/117; C04B 35/62695; C04B 35/6316; C04B 38/0054; C04B 38/0061; C04B 38/0074; C09K 3/1436; Y02P 40/10
See application file for complete search history.

(56) References Cited

U.S. PATENT DOCUMENTS

| | | |
|---|---|---|
| 5,037,452 A | 8/1991 | Gary et al. |
| 5,645,618 A | 7/1997 | Monroe et al. |
| 5,863,308 A | 1/1999 | Qi et al. |
| 6,287,353 B1 | 9/2001 | Celikkaya |
| 2005/0137078 A1 | 6/2005 | Anderson et al. |
| 2009/0093198 A1 | 4/2009 | Subramanian et al. |
| 2013/0086848 A1* | 4/2013 | Sachse .................... C01F 7/027 423/625 |
| 2015/0052824 A1* | 2/2015 | Gebhardt ................ C04B 28/26 51/308 |
| 2017/0107412 A1* | 4/2017 | Monroe ............ C04B 35/62655 |

FOREIGN PATENT DOCUMENTS

| | | |
|---|---|---|
| CN | 1063437 A | 8/1992 |
| CN | 1134692 A | 10/1996 |
| CN | 1188465 A | 7/1998 |
| CN | 1906266 A | 1/2007 |
| CN | 101268014 A | 9/2008 |
| CN | 101460587 A | 6/2009 |
| CN | 101921575 A | 12/2010 |
| CN | 102639296 A | 8/2012 |
| CN | 102811951 A | 12/2012 |
| CN | 104350025 A | 2/2015 |
| CN | 104440608 A | 3/2015 |
| CN | 105592981 A | 5/2016 |
| CN | 106062122 A | 10/2016 |
| CN | 106926146 A | 7/2017 |
| EP | 2 174 751 A1 | 4/2010 |
| JP | 2004-510873 A | 4/2004 |
| JP | 2013-544736 A | 12/2013 |
| RU | 2 566 791 C1 | 10/2015 |

OTHER PUBLICATIONS

Search Report for Chinese Application No. 201880080097.8, dated Mar. 17, 2021.
International Search Report issued Apr. 9, 2019, in International Application No. PCT/EP2018/084234 (3 pgs.).
Bulgakov et al., "Merchandising of Industrial Goods; Introduction, Plastics, Commercial chemicals," (1962).
Search Report for Russian Application No. 2020121583/04(037058), dated Jun. 16, 2022.

* cited by examiner

*Primary Examiner* — Shuangyi Abu Ali
(74) *Attorney, Agent, or Firm* — Finnegan, Henderson, Farabow, Garrett & Dunner, LLP

(57) ABSTRACT

The present invention relates to an agglomerate abrasive grain made up of a plurality of individual abrasive grains which are bonded into an inorganic or organic binder matrix, wherein, based on the total weight of the agglomerate abrasive grain, at least 8% by weight of the abrasive grains which are bonded into the matrix are fused alumina-based polycrystalline alumina abrasive grains with a percentage of more than 97% by weight of alpha-alumina, and wherein the polycrystalline alumina abrasive grains, in turn, are made up of a plurality of $Al_2O_3$ primary crystals with a crystal size of between 20 µm and 100 µm. The agglomerate abrasive grain has a closed macroporosity with a pore volume of between 5% by volume and 30% by volume, wherein the average pore diameter of the closed macropores is between 10 µm and 100 µm and their maximum pore diameter is in the range of approx. 120 µm.

10 Claims, No Drawings

AGGLOMERATE ABRASIVE GRAIN

CLAIM FOR PRIORITY

This application is a U.S. national phase entry under 35 U.S.C. § 371 from PCT International Application No. PCT/EP2018/084234, filed Dec. 10, 2018, which claims the benefit of priority of German Patent Application No. 10 2017 130 046.5, filed Dec. 14, 2017, from both of which this application claims priority and both of which are incorporated herein by reference.

TECHNICAL FIELD

The present invention relates to an agglomerate abrasive grain made up of a plurality of individual abrasive grains which are bonded into an inorganic or organic binder matrix.

PRIOR ART

Agglomerate abrasive grains have been known for a long time in the abrasives industry and are used in abrasive wheels as well as in abrasive belts. They are agglomerations of individual abrasive grains with a predetermined average grain size, wherein the abrasive grains are held together by means of a binder matrix. Inorganic or organic binders can be used as binding agents, whereby phenolic resins are often used as organic binders, while vitrified or ceramic materials are used as inorganic binders.

A large advantage of agglomerate abrasive grains is that finely divided, individual compact abrasive grains can be used as primary particles from which an agglomerate abrasive grain is then formed. The agglomerate abrasive grain consists of a plurality of individual grains, it is relatively large as compared to the initial grains and reveals a completely different wear mechanism with regard to the grinding process as compared to an individual grain with a comparable size.

While, depending on pressure conditions, an individual grain does on principle become dull or is destroyed during the grinding process, the agglomerate abrasive grains can be chosen and can be used specifically in such a way that individual worn abrasive grains break out of the binder matrix and abrasive grains located therebelow are used, so that consistently new cutting edges are formed. Such agglomerate abrasive grains thus have a long life time, are characterized by a cool grinding, and generate a homogeneous uniform surface grinding pattern.

For machining of surfaces by means of abrasives, completely different demands are made on the abrasive, depending on the material to be machined, the used grinding method, and the desired surface quality. The machining of surfaces of different materials, such as, e.g. wood, metal, ceramic, natural stone or synthetic material, thus also requires different grinding conditions and abrasives which need to be individually adapted to the respective application.

While only the abrasive grain type and the abrasive grain size can be varied when using individual abrasive grains, the use of agglomerate abrasive grains offers numerous further options for optimizing the agglomerate abrasive grain for the respective application.

EP 2 174 751 A1 describes abrasive grain agglomerates made up of finely divided primary abrasive grains which are held together by an aluminosilicate-based binder. The used inorganic binder cures completely at temperatures below 450° C. whereby abrasive grain agglomerates of extraordinarily high strengths are formed, which agglomerates have large advantages for a number of applications in which severely workable materials are ground at high pressures. Due to their high strength, these abrasive grain agglomerates are less suitable for mild grinding conditions.

U.S. Pat. No. 4,799,939 describes erodible agglomerates containing individual abrasive grains which are arranged in an erodible matrix of binder and hollow bodies. The hollow bodies are preferably hollow spheres and have the function of making the binder matrix easily degradable. The hollow spheres have a very small diameter, so that as many of these hollow spheres as possible can be embedded in the binder matrix. Organic compounds are preferably used as binders.

GB 2 021 626 discloses an abrasive grain granulate, wherein abrasive grains and pore-forming particles are held together with a synthetic resin binder. The granulates have a grain size of between 420 µm and 2000 µm, wherein the individual abrasive grains have a grain size of smaller than 250 µm and are added in a quantity of between 15 and 40 percent by volume, while the pore-forming particles have a size of between 44 µm and 297 µm and are added in a quantity of between 2 and 75 percent by volume. The binder has a percentage of between 10 and 50 percent by volume. Due to the fact that it was shown that a satisfactory bond is also already achieved when a volume of binder is available, which is significantly smaller than the volume between the solid particles, the completed aggregates can have a network of pores which are connected to one another. This open porosity can reach up to 50% of the total volume of the aggregate.

According to the two last-mentioned documents, relatively soft abrasive grain agglomerates are obtained, which are well suited for mild grinding conditions, in particular in the case of the preferred use of synthetic resin bonds.

U.S. Pat. No. 6,679,782 B2 describes abrasive grain agglomerates for the use in bonded abrasives, which are to have the highest possible open porosity so as to influence the porosity and thus the abrasive effect of the abrasive in this way.

U.S. patent application 2015-0052824 A1 describes abrasive grain agglomerates which are made up of a mixture of individual abrasive grains and hollow bodies, wherein the hollow bodies provide the agglomerate abrasive grains with a desired closed porosity.

Due to the already mentioned different materials and grinding conditions, there is still a large demand for specific agglomerate abrasive grains which are further developed and optimized for specific grinding operations for the machining of surfaces.

DETAILED DESCRIPTION OF THE INVENTION

While searching for a solution for this object, in particular the impact of porosity and strength of agglomerate abrasive grains on their life time and on their behavior in response to the grinding process was considered.

The agglomerate abrasive grains according to invention, made up of a plurality of individual abrasive grains bonded through a binder, have a good grinding efficacity over the time (self sharpening).

The object is ultimately solved by means of an agglomerate abrasive grain made up of a plurality of individual abrasive grains which are bonded into an inorganic or organic binder matrix, wherein, based on the total weight of the agglomerate abrasive grain, at least 8% by weight of the abrasive grains which are bonded into the matrix are fused alumina-based polycrystalline alumina abrasive grains with a percentage of more than 97% by weight of alpha-alumina. The polycrystalline alumina abrasive grains, in turn, are made up of a plurality of $Al_2O_3$ primary crystals with a crystal size of between 20 μm and 100 μm.

When attempting to provide an agglomerate abrasive grain with a defined closed porosity, it was surprisingly found that particularly positive results can be achieved when the respective agglomerate abrasive grain is substantially made up of polycrystalline abrasive grains, which, due to their production, already have a certain closed macroporosity. The polycrystalline abrasive grains are produced by melting alumina in the electric arc furnace according to EP 2 523 906 B1.

In this way, an agglomerate abrasive grain comprising a plurality of individual abrasive grains which are bonded into an inorganic or organic binder matrix can be obtained, wherein, based on the total weight of the agglomerate abrasive grain, at least 8% by weight of the abrasive grains are fused alumina-based polycrystalline alumina abrasive grains with a percentage of more than 97% by weight of alpha-alumina. The polycrystalline alumina abrasive grains, in turn, are made up of a plurality of $Al_2O_3$ primary crystals with a crystal size of between 20 μm and 100 μm. The agglomerate abrasive grain has a closed macroporosity with a pore volume of between 5% by volume and 30% by volume, preferably wherein the average pore diameter of the closed macropores is between 10 μm and 100 μm, preferably between 15 μm and 80 μm, more preferably between 20 μm and 70 μm and preferably their maximum pore diameter is in the range of approx. 120 μm (ie about 120 μm).

Depending on the quantity and type of the used binder, a certain percentage of open porosity can be imparted to the agglomerate abrasive grain, in addition to the closed porosity. Thus, a preferred embodiment of the agglomerate abrasive grain according to the present invention provides an agglomerate abrasive grain additionally having an open porosity of between 1% by volume and 15% by volume.

For the applications which were tested in the course of the development, it was found that the ratio of open to closed porosity should advantageously be between 1:1 and 1:10. This is contrary to many known agglomerate abrasive grains of compact monolithic abrasive grains according to the prior art, in the case of which high percentages of open porosity are often pursued, in order to improve the bonding of the agglomerate abrasive grain in the abrasive by means of the binder penetrating into the open pores. However, the polycrystalline alumina abrasive grain used here has an irregular and rugged surface, so that a good anchoring in the binder matrix of the abrasive is ensured per se. If the open porosity of the agglomerate abrasive grain is too high, there may furthermore be the risk, depending on the type of the used binder, that the polycrystalline alumina abrasive grains are not held firmly enough in the agglomerate abrasive grain. This is particularly critical in the case of the present invention, because the polycrystalline alumina abrasive grains obviously develop a particular wear mechanism in the agglomerate abrasive grain, whereby the individual primary crystals of which the polycrystalline alumina abrasive grain is made up break out of the abrasive grain and new cutting edges are released. This explains the astonishingly high and even material removal with low grain wear for the surface treatment with the agglomerate abrasive grain according to the invention. So that this mechanism can take effect, it is required for the polycrystalline alumina abrasive grain itself to be firmly bonded in the agglomerate abrasive grain.

The open porosity of the agglomerate abrasive grain according to the invention is thus preferably less than 3% by volume, when the binder matrix is based on an organic binder, such as, e.g. phenolic resin.

In contrast, the percentage of open porosity can easily be higher when using a particular inorganic binder, which comprises aluminosilicate and alkali silicate with a molar ratio of $Al_2O_3$ to $SiO_2$ of 1:2 to 1:20 forming extraordinarily tight bonds as a result of the formation of so-called geopolymers, wherein the open porosity of the agglomerate abrasive grain is preferably between 5% by volume and 15% by volume.

As a whole, it turned out to be advantageous, when the sum of open and closed porosity is chosen in such a way that the agglomerate abrasive grain has a bulk density of between 0.9 $g/cm^3$ and 1.8 $g/cm^3$.

It has been shown in some applications that the initiation of the self-sharpening is difficult and only takes place with delay or not at all. It has proven to be advantageous in these cases, when in addition to the polycrystalline alumina abrasive grains, individual monolithic abrasive grains are additionally bonded into the binder matrix, wherein the average grain size of the individual monolithic abrasive grains preferably lies between the maximum grain size of the polycrystalline alumina abrasive grains and the minimum crystal size of the primary crystals which are present in the polycrystalline abrasive grains.

In a particularly advantageous embodiment of the present invention, the individual monolithic abrasive grains which are additionally bonded into the binder matrix have an average diameter of between 20 μm and 100 μm and thus correspond to the size of the primary crystals in the polycrystalline alumina abrasive grains. A homogenous even surface of the workpiece to be machined can be ensured in this way.

The percentage of additional individual compact monolithic abrasive grains is preferably between 5% by weight and 60% by weight, preferably between 10% and 60% by weight, and more preferably between 15% and 55% by weight, based on the total weight of the agglomerate abrasive grain.

According to the present invention, by "individual compact monolithic abrasive grains" we intend to mean homogeneous grains produced either by a fused process, alumina zirconia (grains such as ZK40) or by ceramic process, or chemical process, such as sol-gel process (for examples grain such as SGK2).

The closed porosity can preferably be adjusted by the formation and quantity of the polycrystalline abrasive grains. The adjustment of the open porosity occurs predominantly via the quantity of used binder.

The surpassingly good grinding results can be explained by the tight bond of the polycrystalline alumina abrasive grains in the agglomerate abrasive grain. This makes it possible for the primary crystals in the polycrystalline alumina abrasive grains to break out and new cutting edges are formed without the polycrystalline alumina abrasive grains as a whole breaking out of the agglomerate abrasive grain. Possible disadvantages of the tight bond are obviously compensated by the closed macroporosity which slightly softens the agglomerate abrasive grain as a whole again and which simultaneously facilitates the self-sharpening mechanism, wherein the pores which are released during the grinding process can additionally provide the direct contact of cooling lubricants with the material surface, whereby the surface quality of the machined material is improved.

An advantageous embodiment of the agglomerate abrasive grain according to the present invention provides an agglomerate abrasive grain comprising between 20% by weight and 40% by weight of binder matrix and between 60% by weight and 80% by weight of abrasive grains. Expressed in percent by volume, the advantageous embodiment of the agglomerate abrasive grain has between 20% by volume and 70% by volume of binder matrix and between 30% by volume and 80% by volume of abrasive grains, whereby the percentages by volume of the abrasive grains include the percentages by volume of the closed macropores.

In addition to the already mentioned monolithic abrasive grains, the used binder can additionally comprise fillers and/or grinding aids, for the purpose of which all known fillers and grinding aids, in particular from the group of the sulfides, phosphates, carbonates and/or halides, and/or sulfide, phosphate, carbonate and/or halide-containing complex compounds of the group comprising the elements sodium, silicon, potassium, boron, magnesium, calcium, aluminum, manganese, copper, zinc, iron, titanium, antimony and/or tin can be used.

The agglomerate abrasive grain according to the invention preferably has an average diameter of between 0.4 and 3.0 mm, while the average grain size of the individual abrasive grains which are connected to each other in the agglomerate abrasive grain is preferably between 30 μm and 1000 μm.

DESCRIPTION OF PREFERRED EMBODIMENTS

The invention will be described in detail below by way of examples.

Example 1 (Comparison)

For preparing comparative example 1, eight (8) kg of abrasive grains (ZPSK F150, Imerys) were mixed with 2.45 kg of metakaolin (PoleStar 450, Imerys) in an intensive mixer (type RO1, Eirich) for 5 minutes in counterflow (300 rpm). 2.45 l of a mixture of water and water glass (20 parts water+80 parts silicate Woellner 39T) were subsequently added to this mixture within one minute at 790 rpm. After the liquid was homogenously mixed with the abrasive grain, the pelletizing process was initiated at 200 rpm and was continued until an agglomerate size of between approx. 2 and 5 mm was reached. The agglomerate abrasive grain green bodies obtained in this way were dried on a belt dryer at approx. 125° C. The dried green bodies of the agglomerate abrasive grains were comminuted, classified to a grain fraction of between 1.2 and 1.7 mm, and then cured in a rotary kiln at 450° C.

Example 2 (Comparison)

Example 2 was prepared like example 1, but whereby 8 kg of ZPSK F60 (Imerys) were used as abrasive grains.

Example 3 (Invention)

Example 3 was prepared like example 1, whereby 8 kg of polycrystalline alumina abrasive grains ZPTMX F60 by Imerys were used.

Grinding Test 1 (External Cylindrical Throughfeed Grinding)

From the agglomerate abrasive granulations comprising an average particle size of between 1.2 and 1.7 mm, which granulations were produced according to the above-described examples 1 to 3, abrasive belts were produced by means of which tubes of steel 1.4301 (X5CrNi18-10; V2A) comprising an outer diameter of 50 mm were ground. A stiff polyester support was chosen as support for the abrasive belts, wherein the dimensions of the abrasive belts were 150 mm×2500 mm. Grinding occurred at a cutting speed (Vc) of 30 m/s with a feed rate (Vf) of 2-3 m/min. The roughness values (Rz) were measured at the beginning of the grinding operation and after 6 throughputs at 10 m each. After the 6 throughputs, the belt wear was determined simultaneously by determining the average diameter decrease of the steel tube at 6 predetermined measuring points. An emulsion was used as cooling lubricant.

Agglomerate abrasive grains of compact monolithic abrasive grains with different grain sizes were used for the comparative examples 1 and 2, whereby the chemical composition of all three exemplary granulations is identical and consist of approx. 99% by weight of α-alumina with small percentages of titanium oxide and chromium oxide. Abrasive grains with an average grain size of 70 μm, which thus have an average diameter which corresponds to the diameter of the primary crystals in the polycrystalline alumina abrasive grains ZPTMX were chosen with ZPSK F150 according to FEPA. In example 2, ZPSK F60 was chosen according to FEPA for a direct comparison of monolithic abrasive grains and polycrystalline alumina abrasive grains. The results of the tests are summarized in Table 1 below.

TABLE 1

| Example No. | 1 | 2 | 3 |
|---|---|---|---|
| base grain/grain size according to FEPA | ZPSK F150 | ZPSK F60 | ZPTMX F60 |
| belt coating (coat density) gravity coating | 815 g/m² | 800 g/m² | 830 g/m² |
| throughput time at 6 throughputs with 10 m tube length each | 73 s | 80 s | 80 s |
| average diameter decrease determined at 6 measuring points after each throughput | 15 μm | 18 μm | 15 μm |
| roughness values (Rz) | | | |
| at the beginning | 18.1 μm | 17.7 μm | 17.6 μm |
| after 6 throughputs | 6.4 μm | 5.7 μm | 4.8 μm |
| belt wear after 6 throughputs at 10 m tube length each | 64 g | 44 g | 21 g |

It can be gathered from the above table that the abrasive performances (average diameter decrease of the steel tube) of the three abrasive belts of different agglomerate abrasive grains are approximately comparable to each other, wherein slight advantages can be seen in the case of the belt comprising the coarse compact monolithic abrasive grains ZPSK F60 as base grains for the agglomerate abrasive grain. It comes as a surprise that in the case of the roughness values, the abrasive belt comprising the small monolithic abrasive grains ZPSK 150 (example 1) performs the worst. The best surface quality is obtained here with the agglomerate abrasive grains according to the present invention (example 3) with a roughness value of 4.8 μm. Large differences can be found in the belt wear. With 21 g, the belt from example 3 (invention) has by far the lowest belt wear and thus the highest life time for the abrasive belt. Compared to example 1, example 3 achieves three times the life time and compared to example 2, more than twice the life time. Based on the life time of the abrasive belt, not only a significantly abrasive performance can thus be achieved with the agglomerate abrasive grain according to the present invention, but also the changeover times are simultaneously reduced as well, which is associated with a further improvement of the efficiency of the grinding process. When using the abrasive belt according to example 3, a slight heating of the workpiece was determined, which suggests that the agglomerate abrasive grain is bonded relatively firmly on the polyester support and that the polycrystalline alumina abrasive grains are firmly anchored in the agglomerate as well and are presumably also significantly more wear-resistant than the monolithic abrasive grains. The heat development, however, was never critical, so that no damages to the workpiece needed to be feared.

Example 4 (Comparison)

Example 4 was prepared like example 1, but whereby 8 kg of ZK40 F150 (alumina zirconia by Imerys) were used as abrasive grains.

Example 5 (Invention)

Example 5 was prepared like example 1, but whereby a mixture of 4 kg of ZK40 F150 and 4 kg of ZPTMX F60 (polycrystalline alumina abrasive grain) were used as abrasive grains.

Example 6 (Invention)

Example 6 was prepared like example 1, but whereby a mixture of 1.6 kg of SGK2 F150 (sol-gel corundum by Imerys) and 6.4 kg of ZPTMX F60 (polycrystalline alumina abrasive grain) were used as abrasive grains.

Grinding Test 2 (Counter Direction Flat Grinding)

Abrasive belts, wherewith flat steel 1.4301 (X5CrNi18-10; V2A) comprising the dimensions 50 mm×5 mm×2.000 mm was ground, were produced from agglomerate abrasive grains with an average particle size of between 1.2 and 1.7 mm produced according to the above-described examples 3-6. For this purpose, 3 workpieces were joined together, so that as a whole, a total width of 150 mm of flat steel was ground. As in the case of grinding test 1, a stiff polyester support was chosen as support for the abrasive belts, whereby the length of the grinding belts was 3.000 mm and the belt width was 200 mm. As in the case of grinding test 1, an emulsion was used as cooling lubricant. For the test, 3 grinding cycles were initially carried out for conditioning the belts (calibrating and grinding in). After 30 grinding cycles, the abrasive performances, the roughness values, and the belt wear were subsequently determined in each case.

For the comparative example 4, agglomerate abrasive grains of compact monolithic alumina zirconia abrasive grains having the grit size F150 according to FEPA with an average grain size of 70 μm were used, which thus have an average diameter which corresponds to the diameter of the primary crystals in the polycrystalline alumina abrasive grains ZPTMX. Because of its self-sharpening, alumina zirconia is known for its high abrasive performance. A mixture of alumina zirconia ZK40 F150 with ZPTMX F60 at a ratio of 50:50 was chosen for example 5 according to the invention, and a mixture of sol-gel corundum SGK2 F150 and ZPTMX F60 at a ratio of 20:80 for example 6 which is also in accordance with the invention. Sol-gel corundum was also chosen because of its high toughness and wear resistance. In addition, a belt comprising agglomerate abrasive grains which were made up exclusively of polycrystalline alumina abrasive grains (example 3) was also chosen in grinding test 2. The test results are summarized in Table 2 below.

TABLE 2

| Example No. | 4 | 5 | 6 | 3 |
|---|---|---|---|---|
| base grain/grain size according to FEPA | ZK40 F150 | ZK40 F150 ZPTMX F60 50:50 | SGK2 F150 ZPTMX F60 20:80 | ZPTMX F60 |
| belt coating (coat density) gravity coating | 810 g/m$^2$ | 805 g/m$^2$ | 795 g/m$^2$ | 820 g/m$^2$ |
| stock removal | 62 μm | 61 μm | 68 μm | 60 μm |
| roughness values (Rz) | 2.8 μm | 2.4 μm | 3.1 μm | 1.9 μm |
| belt wear | 48 g | 22 g | 18 g | 25 g |

It can be gathered from Table 2 that in the case of the agglomerate abrasive grains comprising mixtures of abrasive grains the abrasion performances of the grinding belts with different agglomerate abrasive grains is more or less comparable, whereby small advantages can be seen in the case of the belt (example 6) comprising sol-gel abrasive grains in the agglomerate abrasive grain. In the case of the roughness values, the grinding belt (example 3) which exclusively contains polycrystalline alumina abrasive grains ZPTMX performs best. In this regard, disadvantages can be seen in particular in the case of the mixture with sol-gel corundum (example 6). In turn, large differences can be found in the belt wear. It came as a surprise that the two belts comprising the agglomerate abrasive grains with abrasive grain mixtures (examples 5 and 6) reveal less belt wear than the belt comprising the agglomerate abrasive grains containing exclusively polycrystalline alumina abrasive grains. The belt with comparative example 4, in the case of which the agglomerate abrasive grains are made up exclusively of alumina zirconia F150, has the highest belt wear by far. In each case, examples 3, 5 and 6 according to the present invention achieve more than twice the life time compared to this belt representing the prior art. Based on the life time of the abrasive belt, also in the case of this application a significantly higher abrasive performance can be achieved with the agglomerate abrasive grains according to the present invention, compared to conventional agglomerate abrasive grains. For the agglomerate abrasive grains comprising abrasive grain mixtures with polycrystalline alumina abrasive grains, it can thus also be noted that the changeover times can additionally be reduced, which is associated with a further improvement of the efficiency of the grinding process.

The examples specified above are only intended to describe the present invention and should in no way be considered as a limitation. Further analyses by the inventor have shown that agglomerate abrasive grains of mixtures with other abrasive grain types and with other grain sizes have advantages as compared to the conventional agglomerate abrasive grains, as long as certain percentages of the agglomerate abrasive grain consist of polycrystalline alumina abrasive grains. It was thereby found as limit that the agglomerate abrasive grain should contain at least 8% by weight of polycrystalline alumina abrasive grains, based on the total weight of the agglomerate abrasive grain.

The invention claimed is:

1. An agglomerate abrasive grain made up of a plurality of individual abrasive grains which are bonded into an inorganic or organic binder matrix,
   wherein based on the total weight of the agglomerate abrasive grain, at least 8% by weight of the abrasive grains which are bonded into the binder matrix are fused alumina-based polycrystalline alumina abrasive grains with a percentage of more than 97% by weight of alpha-alumina, wherein the polycrystalline alumina abrasive grains, in turn, are made up of a plurality of $Al_2O_3$ primary crystals with a crystal size of between 20 µm and 100 µm;

wherein individual compact monolithic abrasive grains are additionally bonded into the binder matrix at a percentage between 5% by weight and 60% by weight, based on the total weight of the agglomerate abrasive grain; and the agglomerate abrasive grain has a bulk density of between 1.1 g/cm³ and 1.8 g/cm³;

a closed macroporosity with a pore volume of between 5% by volume and 30% by volume; and an average pore diameter of the closed macropores between 10 µm and 100 µm.

2. The agglomerate abrasive grain according to claim 1, wherein the average grain size of the individual compact monolithic abrasive grains lies between the maximum grain size of the polycrystalline alumina abrasive grains and the minimum crystal size of the primary crystals which are present in the polycrystalline abrasive grains.

3. The agglomerate abrasive grain according to claim 1, wherein the individual compact monolithic abrasive grains which are additionally bonded into the binder matrix have an average diameter which corresponds to the average diameter of the primary crystals which are present in the polycrystalline alumina abrasive grains.

4. The agglomerate abrasive grain according to claim 1, wherein the percentage of additional individual monolithic abrasive grains is between 10% and 60% by weight, based on the total weight of the agglomerate abrasive grain.

5. The agglomerate abrasive grain according to claim 1, wherein a maximum pore diameter of the closed macropores is in the range of 10-120 µm.

6. The agglomerate abrasive grain according to claim 1, wherein the agglomerate abrasive grain has an open porosity of between 1% by volume and 15% by volume.

7. The agglomerate abrasive grain according to claim 1, wherein the binder matrix is an organic binder and the open porosity of the agglomerate abrasive grain is less than 3% by volume.

8. The agglomerate abrasive grain according to claim 1, wherein the binder matrix comprises aluminosilicate and alkali silicate with a molar ratio of $Al_2O_3$ to $SiO_2$ of 1:2 to 1:20 and is cured at temperatures of below 500°.

9. The agglomerate abrasive grain according to claim 1, wherein the open porosity of the agglomerate abrasive grain is between 5% by volume and 15% by volume.

10. The agglomerate abrasive grain according to claim 3, wherein the binder matrix comprises aluminosilicate and alkali silicate with a molar ratio of $Al_2O_3$ to $SiO_2$ of 1:2 to 1:20 and is cured at temperatures of below 500°.

* * * * *